United States Patent Office 2,702,800
Patented Feb. 22, 1955

2,702,800

SEPARATION OF ALPHA-, BETA-, AND GAMMA-CASEINS FROM WHOLE CASEIN

Norbert J. Hipp, Philadelphia, and Merton L. Groves and Thomas L. McMeekin, Glenside, Pa., assignors to the United States of America as represented by the Secretary of Agriculture No Drawing. Application July 14, 1952,
Serial No. 298,878

9 Claims. (Cl. 260—120)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the fractionation of casein and particularly to processes for separating alpha,- beta- and gamma-caseins from whole casein.

The protein, casein, though commonly referred to as a single substance is actually heterogeneous and contains approximately 75 percent alpha-casein, 22 percent beta-casein and 3 percent gamma-casein, these individual proteins differing markedly in composition, properties and uses. For scientific studies on physical, chemical or nutritional properties, the pure, homogeneous casein fractions are much more valuable than the whole casein.

It has been found that whole casein can readily be separated into these components by utilizing the differing solubilities of the components in aqueous urea solutions. In brief, the separation is carried out by dissolving whole casein such as that freshly prepared from skim milk or the dried product, in concentrated aqueous urea solution and then reducing the concentration of the solution by adding water thus to cause selective precipitation of the components. To explain further, whole casein is dissolved in aqueous urea solution of at least 6.6 molar concentration in which it is completely soluble. When the concentration of urea in such a solution is reduced to 4.6 molar by the addition of water, alpha-casein is precipitated and may be separated from the solution. After removal of the alpha-casein, the urea concentration of the solution is reduced to 1.7 molar by the addition of water whereupon the beta-casein precipitates. After removal of beta-casein the remaining solution still contains gamma-casein and this component may be precipitated by dilution with water or by addition of ammonium sulfate. All of the precipitations described above are carried out at room temperature. The procedure in accordance with this invention is simple and the individual components are recovered in good yield. The precipitates obtained in each stage may be again subjected to the same plan of separation thus to obtain each fraction in a purified form.

The following example illustrates the invention in greater detail. The purity of the products described in the example was established by means of the standard electrophoresis method.

Example

Four hundred grams of whole casein was swollen by the addition of 1100 cc. of water and the swollen casein was dissolved by the addition of 1500 grams of urea and water to make a total volume of 3.75 liters, giving a urea concentration of 6.6 molar.

Isolation of alpha-casein

When the temperature became that of room temperature, 1.65 liters of water was added slowly with stirring to the casein-urea solution, making the concentration of urea 4.63 molar. The precipitate formed under these conditions was largely alpha-casein and it was removed by centrifugation. The crude alpha-casein was further purified by dissolving in 1500 cc. of 6.6 molar urea containing 15.9 grams of sodium chloride. Alpha-casein was precipitated by the addition of 1500 cc. of water and removed by centrifugation. Further impurities were removed by washing with a 4.7 molar urea solution. Urea was removed from the product by washing with an excess of water. After drying, 205 grams of pure alpha-casein was obtained, which gave a calculated yield of 68 percent based on the alpha-casein content of the whole casein used.

Isolation of beta-casein

The casein-urea solution, obtained after the removal of the precipitated alpha-casein at 4.63 molar urea, was diluted to 3.3 molar urea by the addition of water. The small insoluble precipitate obtained was a mixture of alpha- and beta-casein and was removed by centrifugation and discarded. The remaining solution was diluted to 1.7 molar urea and the pH adjusted to 4.7 by the addition of about 20 cc. of 0.1 normal hydrochloric acid. Crude beta-casein was precipitated and was removed by centrifugation. Purified beta-casein was made by dissolving the crude beta-casein in 4.6 molar urea, diluting the solution to 3.3 molar urea whereupon a precipitate formed. After removal of the precipitate, the soluble portion, containing pure beta-casein, was precipitated by dilution with water to 1.7 molar urea. Under these conditions, 32 grams of pure beta-casein was obtained, being a yield of 40 percent based on the total beta-casein in the whole casein used. By reworking the material insoluble in 3.3 molar urea, the yield of pure beta-casein could be increased.

Isolation of gamma-casein

The casein solution, soluble in 1.7 molar urea, obtained from the supernatant of the crude beta-casein precipitate, was precipitated by adding solid ammonium sulfate to the solution until the concentration of the solution was 1.6 molar ammonium sulfate. The completely precipitated casein was removed by filtration, washed free from ammonium sulfate and dried. From 20 to 30 grams of the dried casein was obtained. This material contained 40 percent gamma-casein and 60 percent beta-casein. Gamma-casein was obtained from this material by dissolving in 2 molar urea to make a 10 percent casein solution. The solution was diluted with water until the concentration of urea became 1 molar and then warmed to 60° C. and the insoluble material removed by centrifugation. Gamma-casein was precipitated from the supernatant by adding solid ammonium sulfate. By repeating this operation of dissolving the portion insoluble in 1.0 molar urea in 2 molar urea and reprecipitating by dilution to 1.0 molar urea, the yield of gamma-casein could be increased. The material, precipitated with ammonium sulfate, contained 80 percent gamma-casein and 20 percent beta-casein. Pure gamma-casein was obtained by dissolving in dilute sodium hydroxide and precipitating the impurities at pH 4.7 and 2° C. The supernatant was made to pH 5.8 and 2° C. and then warmed to 30° C. Pure gamma-casein precipitated and was removed and dried. About 3 to 4 grams of gamma-casein were obtained, being a yield of 25 percent based on the total gamma-casein in the starting material.

Having thus described our invention, we claim:

1. A process for separating whole casein into its components which comprises dissolving whole casein in aqueous urea solution having a urea concentration sufficient to obtain complete solution, reducing the urea concentration of the resulting solution to about 4.6 molar by addition of water, removing precipitated alpha-casein, reducing the urea concentration of the remaining solution to about 1.7 molar by addition of water, removing precipitated beta-casein, then precipitating gamma-casein present in the remaining solution.

2. A process for separating alpha-casein from a casein material containing the same which comprises dissolving the casein material in aqueous urea solution having a urea concentration sufficient to obtain complete solution, reducing the urea concentration of the resulting solution to about 4.6 molar by addition of water, and separating the precipitated alpha-casein.

3. A process for separating beta-casein from a casein material containing the same which comprises dissolving the casein material in aqueous urea solution having a sufficient urea concentration to obtain complete solution, precipitating and removing alpha-casein, where present, by addition of water, then reducing the urea concentration of the solution to about 1.7 molar by addition of water, and separating the precipitated beta-casein.

4. A process for separating gamma-casein from a casein material containing the same which comprises dissolving the casein material in aqueous urea solution having sufficient urea concentration to obtain complete solution, precipitating and removing alpha- and beta-casein, where present, in stages, by the addition of water at each stage, then adding ammonium sulphate in about 1.6 molar concentration to the solution and separating the precipitated gamma-casein.

5. A process of fractionating whole casein into its component fractions which comprises dissolving whole casein in aqueous urea solution of at least about 6.6 molar concentration, reducing the urea concentration of the resulting solution in stages by the addition of water at each stage, and removing the material precipitated at each stage.

6. A process for separating whole casein into its components which comprises dissolving whole casein in aqueous urea solution of at least about 6.6 molar concentration, reducing the urea concentration of the resulting solution to about 4.6 molar by addition of water, removing precipitated alpha-casein, reducing the urea concentration of the remaining solution to about 1.7 molar by the addition of water, removing precipitated beta-casein, then precipitating gamma-casein present in the remaining solution.

7. A process for separating whole casein into its components which comprises dissolving whole casein in aqueous urea solution of about 6.6 molar concentration, reducing the urea concentration of the resulting solution to about 4.6 molar by addition of water, removing precipitated alpha-casein, reducing the urea concentration of the remaining solution to about 1.7 molar by the addition of water, removing precipitated beta-casein, then precipitating gamma-casein present in the remaining solution.

8. A process for separating whole casein into its components which comprises dissolving whole casein in aqueous urea solution having a urea concentration sufficient to obtain complete solution, reducing the urea concentration of the resulting solution to about 4.6 molar by addition of water, removing precipitated alpha-casein, reducing the urea concentration of the remaining solution to about 1.7 molar by addition of water, removing precipitated beta-casein, precipitating gamma-casein present in the remaining solution, and purifying the precipitated gamma-casein by dissolving it in dilute aqueous sodium hydroxide, cooling the resulting solution to about 2° C., acidifying it to a pH of about 4.7, removing precipitated impurities, adjusting the pH to about 5.8, warming from 2° to about 30°, and recovering the resulting precipitated gamma-casein.

9. A process for separating gamma-casein from a casein material containing the same which comprises dissolving the casein material in aqueous urea solution having sufficient urea concentration to obtain complete solution, precipitating and removing alpha- and beta-casein, where present, in stages, by the addition of water at each stage, then adding ammonium sulphate in about 1.6 molar concentration to the solution, separating the precipitated gamma-casein, and purifying the gamma-casein by dissolving it in dilute aqueous sodium hydroxide, cooling the resulting solution to about 2° C., acidifying it to a pH of about 4.7, removing precipitated impurities, adjusting the pH to about 5.8, warming from 2° to about 30°, and recovering the resulting precipitated gamma-casein.

References Cited in the file of this patent

FOREIGN PATENTS 467,812    Great Britain _____ June 22, 1937

OTHER REFERENCES

Groh, Z. Physiol Chem., vol. 226, pp. 32–38 (1934).
Sutermeister, Casein and Its Industrial Applications, 2nd ed., 1939, Rheinhold Pub. Co., N. Y., N. Y., p. 68 and p. 101.